(12) United States Patent
Smith et al.

(10) Patent No.: US 7,035,211 B1
(45) Date of Patent: Apr. 25, 2006

(54) BROADBAND SWITCHING NETWORK

(75) Inventors: Avril J. Smith, Oxford (GB); John L. Adams, Suffolk (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 08/983,268

(22) Filed: Sep. 10, 1997

Related U.S. Application Data

(63) Continuation of application No. PCT/GB96/00535, filed on Mar. 8, 1996.

(30) Foreign Application Priority Data

Mar. 8, 1995 (EP) ............................................. 95301524

(51) Int. Cl.
*G01R 31/08* (2006.01)

(52) U.S. Cl. .................... 370/230; 370/468; 370/395.21
(58) Field of Classification Search ................ 370/230, 370/231, 232, 235, 234, 389, 395.1, 396, 370/398, 465, 468, 477, 395.2, 395.21
See application file for complete search history.

(56) References Cited

U.S. PATENT DOCUMENTS

| | | | |
|---|---|---|---|
| 5,179,556 A | * | 1/1993 | Turner ........................ 370/233 |
| 5,231,631 A | | 7/1993 | Buhrke et al. |
| 5,258,979 A | * | 11/1993 | Oomuro et al. ............. 370/232 |
| 5,265,091 A | | 11/1993 | van Landegem |
| 5,271,005 A | | 12/1993 | Takase et al. |
| 5,280,470 A | | 1/1994 | Buhrke et al. |
| 5,289,462 A | | 2/1994 | Ahmadi et al. |
| 5,291,481 A | | 3/1994 | Doshi et al. |
| 5,313,454 A | | 5/1994 | Bustini et al. |
| 5,315,586 A | * | 5/1994 | Charvillat ................... 370/232 |
| 5,367,517 A | | 11/1994 | Cidon et al. |

(Continued)

FOREIGN PATENT DOCUMENTS

| | | |
|---|---|---|
| EP | 0413488 | 2/1991 |
| EP | 0487235 | 5/1991 |

(Continued)

OTHER PUBLICATIONS

Smith, "A Congestion Control Protocol for ATM Switches", PhD Thesis, Jun. 1994, ITU–T Recommendation 1.371: "Traffic and Congestion Control in B–ISDN", Mar. 1993.

(Continued)

*Primary Examiner*—Bob Phunkulh
(74) *Attorney, Agent, or Firm*—Nixon & Vanderhye, P.C.

(57) ABSTRACT

In a broadband switching system for the switching of asynchronously transferred cells of data, a dynamic bandwidth controller (DBC) controls the application of data cells at an input port of the system, the data cells being supplied by a number of transmitting end-stations. The DBC detects incoming cells, identifies the source of the cells, provides buffering for the cells, and controls the output of the cells to the system switches according to a current cell rate (CR) assigned to the cells from the respective source. The system also includes a connection admission (CAC) module which determines bandwidth available in the system. The DBC and CAC operate together to maintain a permanent virtual path of a predetermined minimum bandwidth through the system and allocate additional bandwidth on demand up to a maximum. The additional bandwidth allocated to the path can be automatically removed or reduced of it is not used by the source. Feedback to the source can be provided to prevent cells being supplied at a rate which would result in significant cell loss due to the limitation of bandwidth available for the path in the system.

11 Claims, 11 Drawing Sheets

U.S. PATENT DOCUMENTS

| | | | |
|---|---|---|---|
| 5,377,327 A | | 12/1994 | Jain et al. |
| 5,448,559 A | * | 9/1995 | Hayter et al. ............... 370/398 |
| 5,463,620 A | | 10/1995 | Sriram |
| 5,497,375 A | | 3/1996 | Hluchyj et al. |
| 5,528,592 A | * | 6/1996 | Schibler et al. ............. 370/397 |
| 5,570,355 A | * | 10/1996 | Dail et al. .................. 370/352 |
| 5,570,360 A | | 10/1996 | Klausmeier et al. |
| 5,577,035 A | * | 11/1996 | Hayter et al. ............... 370/395 |
| 5,604,742 A | | 2/1997 | Colmant et al. |
| 5,633,859 A | | 5/1997 | Jain et al. |
| 5,633,861 A | | 5/1997 | Hanson et al. |
| 5,636,212 A | | 6/1997 | Ikeda |
| 5,677,906 A | | 10/1997 | Hayter et al. |
| 5,696,764 A | * | 12/1997 | Soumiya et al. ............ 370/395 |
| 5,898,670 A | | 4/1999 | Hoebeke et al. |
| 5,940,370 A | | 8/1999 | Curtis et al. |
| 5,982,771 A | | 11/1999 | Caldara et al. |
| 6,011,804 A | | 1/2000 | Bertin et al. |

FOREIGN PATENT DOCUMENTS

| | | |
|---|---|---|
| EP | A-0448073 | 9/1991 |
| EP | 0452223 A2 | 10/1991 |
| EP | A-0468802 | 1/1992 |
| EP | A-0522391 | 1/1993 |
| EP | 0535860 | 4/1993 |
| EP | 0603099 | 6/1994 |

OTHER PUBLICATIONS

Romanow et al., "Dynamics of TCP Traffic over ATM Networks", ATM Flow Control, Ian Akyildiz, Georgia Tech, pp. 79–88.

Bolla et al., "An Integrated Dynamic Resource Allocation Scheme for ATM Networks", IEEE Infocom 93, The Conference on Computer Communications, Proceedings, vol. 3, Mar., 1993, pp. 1288–1297.

Atai, "A Rate–Based Feedback Traffic Controller for ATM Networks," Bell Communications Resarch, IEEE, 1994, pp. 1605–1615.

Bernabei, "Analysis of ON–OFF Source Shaping for ATM Multiplexing,"Infocom Department, IEEE, 1993, pp. 1330–1336.

Sriram, "Methodologies For Bandwidth Allocation, Transmission Scheduling, And Congetion Avoidance In Broadband ATM Networks", 8213 Computer Networks 26(1993) Sep., No. 1, Amsterdam, NL.

Yazid, "Fast Reservation Protocol and Statistical Multiplexing: a Comparative Study", IEEE, 1994, pp. 733–737.

Newman, "Backward Explicit Congestion Notification for ATM Local Area Networks,"N.E.T. Adaptive Division, Redwood City, CA, Nov. 29, 1993, 5 pages.

Chapter 2, "Congestion Control in the B–ISDN", pp. 7–284.

Crocetti et al, IEEE Infocom '91, vol. 3,7 Apr. 1991, Bal Harbor, pp. 1145–1150 "Bandwidth Advertising for MAN/ATM Connectionliess Internetting".

Saito et al, Transactions of the Institute of Electronics, Information and Communications Engineers, vol. E74, No. 4, Apr. 1991, Tokyo, pp. 761–771, "Traffic Control Technologies in ATM Networks".

Tranchier et al, International Switching Symposium, vol. 2, Oct. 1992, Yokohama, pp. 7–11, "Fast Bandwidth Allocation in ATM Networks".

Caho et al, International Switching Symposium, vol. 1, 25 & 30 Oct. 1991, Yokohama, pp. 1229–1233, "A General Architecture for Link–Layer Congestion Control in ATM Networks".

* cited by examiner

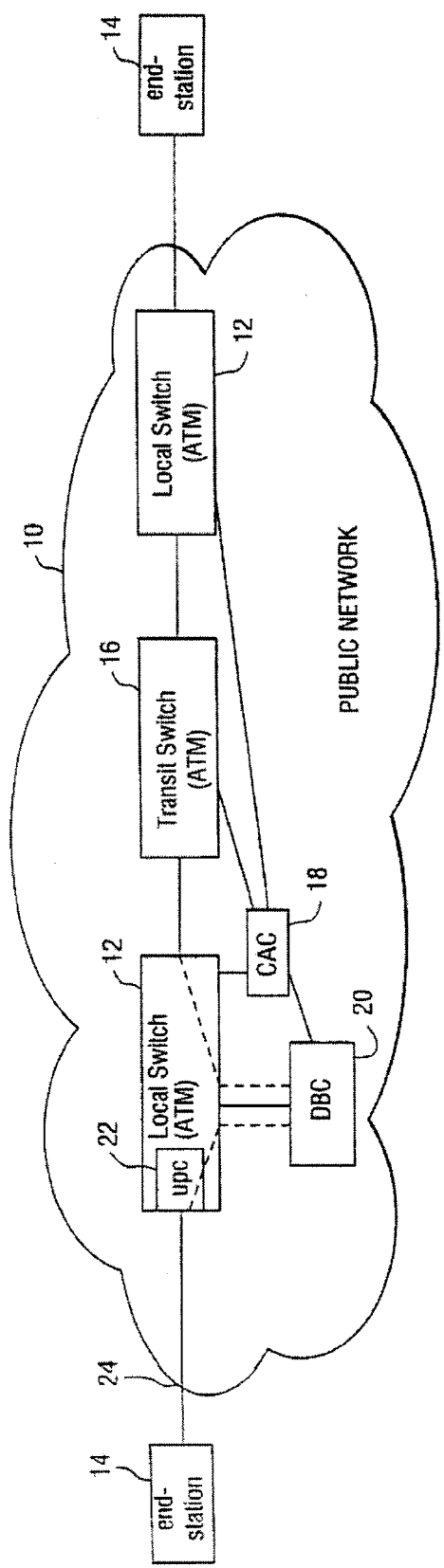
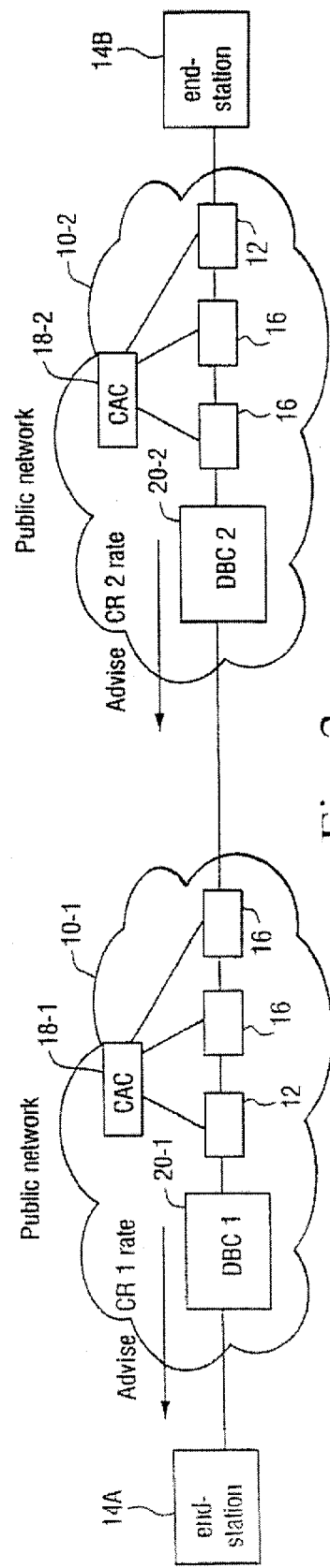
Fig. 1
Fig. 2

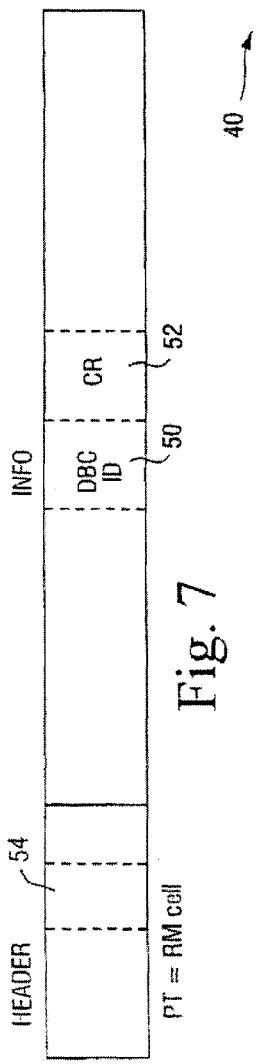
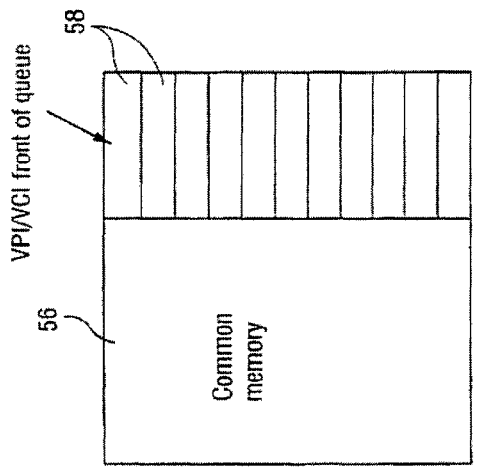
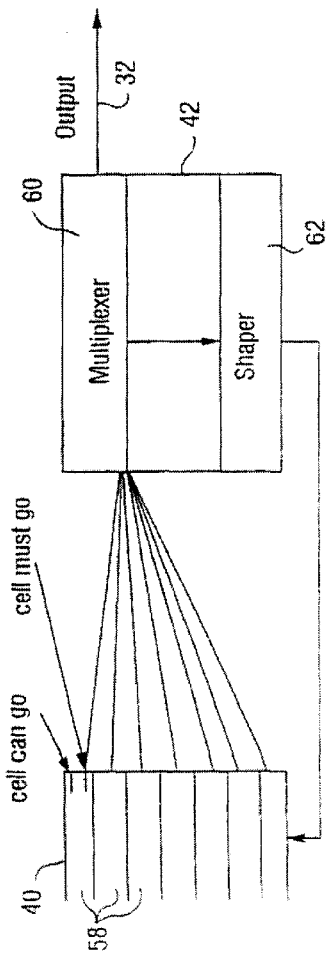

BROADBAND SWITCHING NETWORK

This application is a continuation of PCT application No. PCT/GB96/00535, filed 8 Mar. 1996 and designating the U.S.

RELATED APPLICATIONS

This application is related to commonly owned applications:

U.S. Ser. No. 08/619,653, filed Mar. 22, 1996, now U.S. Pat. No. 5,784,358; U.S. Ser. No. 08/913,270, filed May 4, 1998; U.S. Ser. No. 08/999,749, filed Sep. 10, 1997; and U.S. Ser. No. 09/029,323, filed Feb. 23, 1998.

This invention relates to a broadband switching network for the switching of asynchronously transferred data cells, and to a method of switching asynchronously transmitted data cells.

Broadband switching networks for switching asynchronously transferred cells are known, in which a predetermined level of bandwidth is allocated to a transmission channel connecting a first customer to a second customer. In some of these known systems, a communications channel is provided over a significant period of time, effectively of the leased-line type, and manual measures are implemented in order to set up such a connection or to modify a connection according to the particular terminations and the level of traffic being conveyed. Consequently, it is usual for customers to incur a fixed rate charge as part of the overall charge for the connection, resulting in payment being made irrespective as to whether the connection is being used or not.

Alternative systems have been proposed or are available. In particular, it is possible for connections to be established on a dial-up basis, requiring termination equipment to be provided with facilities for establishing connections by issuing signalling commands and responding to similar commands issued by the network.

The use of permanent circuits to support a private communications network is widespread. The demand for such circuits is expected to grow to include broadband rates above 2 Mbit/s, the circuits carrying traffic multiplexed from sources which are inherently bursty, possibly together with traffic which is transmitted at constant bit rates and is delay sensitive, such as voice transmission and constant bit-rate video.

Asynchronous transfer mode (ATM) cells all have a fixed information field of forty eight octets which can carry customer traffic or customer-originating control information (signalling). These two types of data transmission are distinguished by setting virtual path (VP) and vertical circuit (VC) values in the cell headers. Another field provided in the ATM header is known as cell loss priority, which enables low priority cells to be distinguished from high priority cells. In the event of congestion, the low priority cells may be discarded first.

For private circuits within an ATM based network, the desired route, the required bandwidth, and the quality of service (QOS) are set up using network management procedures. The private circuits are known as permanent virtual circuits (PVCs) because there is no actual physical circuit, only a VP/VC value or "label" which is associated with information stored in the switches to determine the route and preserve the bandwidth and QOS requirements. Several PVCs which follow the same general route may be grouped into a virtual path (VP).

A disadvantage of all known permanent circuits is that the bandwidth remains assigned to the circuit, even when the customer has nothing to transmit. This means that the customer may have to pay higher charges than would be obtained if the bandwidth was only made available when needed. The assumption being made here is that charging is related to reserved bandwidth, and this is not necessarily correct in terms of the way public network operators may choose to charge for virtual circuits. However, it is expected that charging based on reserved bandwidth will become a significant factor in the future.

A common practice is to set up a permanent virtual circuit so that it is only available during certain hours of the day, or during certain days of the week. A difficulty with this approach is that it does not allow the customer to change the pattern of usage quickly, and it may only crudely reflect the usage required by the customer.

A second proposal has been to provide the customer with a separate communications channel to the network management plane, thereby allowing a permanent virtual circuit to be reconfigured. A difficulty with this approach is that some time delay will be incurred before the customer can start to use the virtual circuit.

A third proposal is to introduce equipment at every switching point in the network that recognises a fast resource management cell, indicating that bandwidth should now be assigned to the circuit. A difficulty with this approach is that there is no internationally agreed standard for a bandwidth-recuesting cell that would be recognised by the switching equipment produced by the various manufacturers.

According to a first aspect of the invention, a broadband switching system having at least one ingress for connection to a respective signal source and at least one egress for connection to a selected signal receiving system, the switching system having at least one switch for transmitting information-carrying asynchronously transferred data cells from the ingress to the egress, system control means for accepting and establishing a virtual connection at a predetermined base bandwidth between the ingress and the egress via the said switch, and bandwidth control means arranged to detect the cells received at the ingress, to determine the bandwidth requirement of the detected cells and automatically in response to such cell detection and bandwidth determination, to cause the system control means selectively to allocate additional bandwidth as required in addition to the base bandwidth for the transmission of the cells to the egress.

In this way, it is possible to alter the total bandwidth available in the system for cells intended for a given path dynamically in response to the detected usage level whilst still providing a guaranteed minimum bandwidth connection for delay sensitive data such as voice and video information. Additional bandwidth is allocated as required and avoiding the need for the customer to issue a bandwidth request signal prior to using the additional bandwidth.

It is expected that the customer will, prior to using the system, have already registered his base (e.g. minimum) bandwidth requirement and the destination for the connection. The customer may also register a maximum bandwidth requirement. Conveniently, the system control means may include a stored table for associating the predetermined bandwidth with a respective signal source.

The system control means preferably accepts and establishes a permanent virtual connection, the term "permanent" here meaning that the connection at the predetermined base bandwidth is maintained from the time when it is established until the switching system receives an indication that the customer no longer requires the connection.

The bandwidth control means preferably include feedback means arranged to transmit a maximum cell rate value to the ingress for transmission to a signal source to indicate to the signal source, a maximum permitted rate of supply of cells to the ingress. The bandwidth controller may also be arranged to detect when a signal source is inactive and to transmit a maximum cell rate value to a signal source which is inactive, which represents a bandwidth higher than the bandwidth allocated for cells from that signal source.

Preferably, additional bandwidth is requested from the system control means generally on the basis that the transmitting signal source should be allocated as much additional bandwidth as is available (or up to a pre-registered maximum amount) on the system for the indicated route. Such bandwidth will be allocated depending on the level of traffic in the system at the time the system control means is caused to allocate bandwidth. However, in the preferred embodiment of the invention, the rate at which cells are supplied to the ingress from a given signal source is monitored and, if the allocated bandwidth is more than that required to transmit the cells at the monitored rate, the system control means are caused by the bandwidth control means to allocate less bandwidth to these cells, e.g. after a predetermined time interval, thereby making bandwidth available to other customers.

The bandwidth control means may include cell rate estimating means for estimating the rate of supply of cells to the ingress from a signal source, and following estimation by the estimating means, the bandwidth control means may be arranged to cause the system control means to allocate additional bandwidth for cells from the signal source such that the total bandwidth allocation is equivalent to the estimated cell rate and the bandwidth control means may cause the feedback means to transmit a maximum cell rate indicator to the signal source indicating the estimated rate as the maximum permitted rate of cell supply to the ingress.

Preferably, the bandwidth controller is arranged periodically to cause estimation of the cell rate and consequently to cause reallocation of bandwidth by the system control means and retransmission of a maximum cell rate according to the estimated cell rate.

The signal source may be given a cell-rate indicator (via the feedback means) which permits it to transmit at a rate corresponding to a pre-registered maximum bandwidth. When the signal source starts to transmit at a rate which requires more than the predetermined bandwidth, it is briefly sent a cell rate indicator signal instructing it to reduce the cell rate to a rate corresponding to the predetermined bandwidth. This allows the bandwidth control means time to obtain an increased bandwidth allocation from the system control means in order to provide the additional bandwidth. In this situation, buffering is provided in the bandwidth control means to buffer cells whilst additional bandwidth is being allocated.

Such buffering may be used on other occasions when a signal source is transmitting at a higher rate than the rate being accepted onto the system at a given time. Indeed, it is preferable for the buffer to have means for detecting when it is filled to a predetermined threshold level, the feedback means being responsive to the buffer to cause a retransmission of a cell rate indicator signal to the signal source when connected to the ingress. Preferably, detection of filling of the buffer to a predetermined threshold level causes a reduced cell rate indicator signal to be transmitted to the signal source, the signal source having the facility then to reduce its cell rate to avoid buffer overflow and consequent loss of data.

The number (as opposed to the reaching of a threshold level) of cells for a particular VP/VC in the buffer may also be used to determine whether the customer is supplying incoming cells at a rate greater than that at which they are being accepted onto the system. By assessing this number periodically, the bandwidth control means is able to determine whether more or less bandwidth is required by the signal source. In addition, by deliberately permitting the signal source to transmit at a rate greater than the rate at which cells are being accepted onto the system, it is possible to determine whether the signal source is making use of its maximum permitted bandwidth by monitoring the change in the number of cells in the buffer. A decreasing number indicates that cells are being accepted at a rate greater than that at which the signal source is supplying them i.e. maximum use of the bandwidth is not being made by the signal source. In this situation, the excess bandwidth may be de-allocated.

The bandwidth control means of the preferred embodiment are arranged to cause automatic allocation of additional bandwidth for cells received from a number of signal sources, and may include an activity detector and a controller, the activity detector being operable to detect the incoming cells and to identify the signal source transmitting the detected cells, with the controller being operable in response to the said detection and identification to transmit a bandwidth request message to the system control means to allocate additional bandwidth specifically to the cells transmitted by that identified signal source.

The bandwidth control means may include a cell counter for counting cells received from respective signal sources coupled to the bandwidth control means, thereby to generate charging signals for customer billing and for other purposes. This counter may be part of an activity detector associated with a controller in the bandwidth control means, the activity detector being operable to detect incoming cells and identify the signal source transmitting the detected cells, with the controller being operable in response to the detection and identification to transmit a bandwidth request message to the system control means to allocate a level of bandwidth specifically to the cells transmitted by the identified signal source.

According to a second aspect of the invention, a dynamic bandwidth controller for a broadband switching system, which system is for transmitting information-carrying asynchronously transferred data cells from an ingress of the system to an egress of the system via at least one switch, wherein the controller comprises means for causing the establishment of a permanent virtual connection at a predetermined base bandwidth between an ingress and an egress, means for detecting the said cells received at the ingress, means for determining the bandwidth requirement of the detected cells and means for issuing a bandwidth request signal automatically in response to such cell detection and bandwidth determination to cause additional bandwidth in addition to the base bandwidth to be allocated in the system for the transmission of the cells to the egress.

It is known to provide usage control means or so-called usage parameter control (UPC) to downgrade the priority of cells or to discard cells according to priority designations as a means of controlling the application of traffic from an signal source to the system. Where such usage control means are present, the bandwidth control means may provide signals for the usage control means in response to the allocation of bandwidth by increasing a first predetermined threshold level at which the usage control means downgrades the priority of transmitted cells.

In the preferred embodiment of the invention, the first predetermined level of the usage control means is set to zero when no actual use is being made of the network by the end-system, resulting in initial cells being downgraded to low priority. Indeed, after a time-out period of the bandwidth control means having been exceeded with a particular end-system having transmitted no data cells, the bandwidth allocated to that end-system is reduced to zero.

Preferably, the bandwidth control means adjusts the first predetermined level set by the usage control means by transmitting a message to the system control means, which in turn issues a message to the usage control means.

According to a third aspect of the invention, there is provided a method of operating a broadband switching system for transmitting information-carrying asynchronously transferred data cells from an ingress of the system to an egress of the system via at least one switch, the method comprising maintaining a virtual connection with a predetermined minimum bandwidth between the ingress and the egress, detecting the rate at which the cells for the said connection are supplied to the ingress, and, automatically in response to detection of a cell supply rate in excess of that which can be accommodated by the minimum bandwidth, allocating additional bandwidth to the connection. The preferred method is characterised in that the additional bandwidth is limited to a maximum value, in that a feedback signal is generated and fed back to the ingress for limiting the rate at which cells for the said connection are supplied to the ingress according to the level of additional bandwidth available in the system for the connection, and in that the additional bandwidth is de-allocated in response to detection of a supply cell rate which is less, by a predetermined amount, than that which can be accommodated by the sum of the minimum bandwidth and the allocated additional bandwidth.

The invention will now be described in greater detail by way of example with reference to the accompanying drawings in which:

FIGS. 6-1 and 6-2 are SDLs for the controller module of FIG. 4;

FIG. 7 is a diagram of a resource management (RM) data cell;

FIG. 9 is a diagram of a buffer for the bandwidth controller of FIG. 4;

FIG. 11 is a block diagram of a shaper/multiplexer module and its connection to the buffer of FIG. 6;

FIGS. 12-1, 12-2, and 12-3 are SDLs for the shaper/multiplexer module;

In its preferred form, the invention is concerned with a broadband switching system which may form part of or may constitute a public switching network for the transmission of asynchronously transferred data cells between end-systems.

Figures 1, 6:
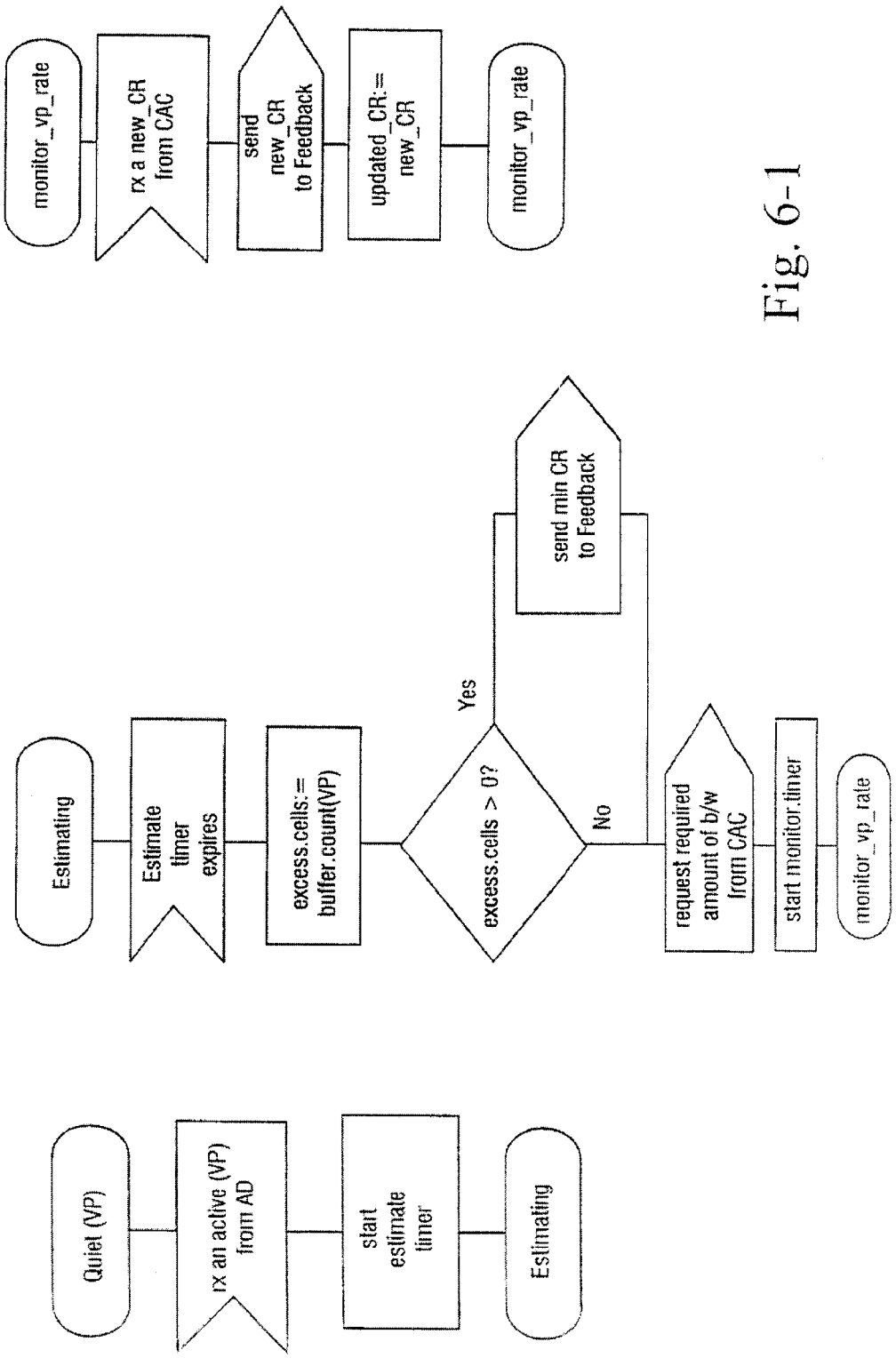

Referring to FIG. 1, the public network 10 has a plurality of switches operable in asynchronous transfer mode (ATM). In this simple example, the switches include two local switches 12 each having a port for connection to a respective end-system 14, and a transit switch 16 interconnecting the local switches 12. Associated with the switches is a connection admission control function (CAC) 18 and a dynamic bandwidth controller (DBC) 20 for controlling traffic entering the network through one of the local switches 12. This switch 12 also includes a usage parameter control device 22 for dynamically altering the priority of data cells received at the input port 24 of the network from the end-system 14.

It will be understood that, in practice, the network 10 will include large numbers of local and transit switches 12, 16 and several DBCs 20 all interconnected to form a network having a plurality of ports such as port 24 for connecting several end-systems such as end-system 14. Using the DBC 20, the public network 10 is able to provide an available bit rate (ABR) service, the DBC acting to detect incoming cells supplied to the input port 24 and, automatically in response to this detection, to cause the CAC 18 to allocate bandwidth for the transmission of the cells to the destination end-system. Generally, end-systems 14 requiring the ABR service are allocated to a fixed DBC 20. There may be more than one DBC 20 for each local ATM switch 12. In the case of a fault, end-systems can be rerouted to a standby DBC (not shown).

Data is transmitted in the form of asynchronous transfer mode (ATM) cells, each having an information field of forty-eight octets, in addition to a header of five octets, which includes information facilitating transmission through the network itself. Thus, routing is controlled on a cell-by-cell basis and a plurality of transmission paths and time multiplexed slots may be employed for any particular link. ATM cells are, therefore, transmitted via virtual paths and virtual circuits, as defined by the header information.

The virtual paths and virtual circuits are identified by a virtual path identifier (VPI) and a virtual channel identifier (VCI) in the five octet header which effectively defines the connection between the end-systems so that cells forming part of a common message will be transmitted over the same connection. ABR traffic enters the public network 10 by routing cells according to their VPIs and VCIs through the DBC 20 and then out to external routes, as shown in FIG. 1. From the DBC 20, the traffic on each virtual path and virtual channel is restricted to a cell rate (which will be referred to hereinafter as "CR"), determined by the CAC 18.

Figures 2, 6:
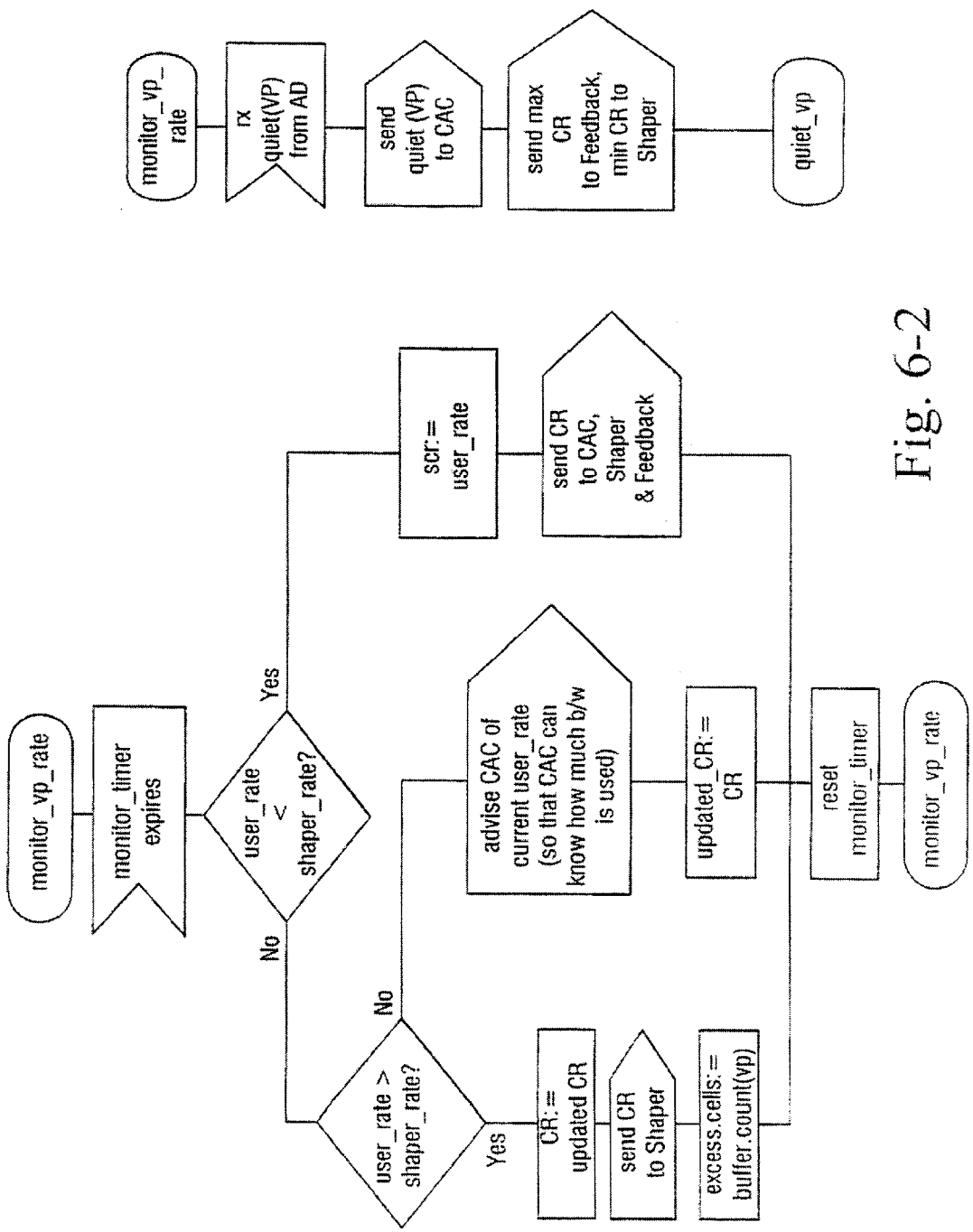

An alternative illustrative arrangement is shown in FIG. 2. In this case, end-system 14A is subject to the control of more than one DBC. In fact, the connection between two end-systems 14A, 14B is routed through two public networks 10-1 and 10-2. Each network 10-1, 10-2 has its own DBC 20-1, 20-2 responsible for restricting traffic entering the network according to the bandwidth allocated by its own connection admission control function (CAC) 18-1, 18-2. Each DBC 20-1, 20-2 is also responsible for advising the end-system 14A of the current applicable CR.

In the systems of both FIG. 1 and FIG. 2, a guaranteed minimum bandwidth is permanently allocated between the end-systems 14, and the DBCs 20, 20-1, 20-2 request additional bandwidth as it is required, from the respective CAC 18, 18-1, 18-2 whilst buffering any incoming data cells which cannot immediately be transmitted to the respective switches 12, 16. The CAC 18, 18-1, 18-2 then allocates additional bandwidth to the cells up to a pre-registered maximum bandwidth associated with the connection between the end-systems and corresponding to the most narrowband circuit in the path identified by the VPI and VCI of the relevant cells. This allocation is then indicated to the DBC 20, 20-1, 20-2 which communicates a maximum CR to the transmitting end-system 14 which maximum CR may not be equivalent to the bandwidth indicated by the CAC 18, 18-1, 18-2 as described below. As a consequence, the impression is given that the network is permanently configured to make bandwidth available for data transmission, even when the user does not have a requirement to make use of the available bandwidth. However, as will become apparent hereinafter, the user need only be charged when making actual use of the network, preferably by charging on the basis of the number of cells transmitted over the logical link between end-systems. Thus, prior to transmission being invoked by, say, user A, the network may actually allocate no additional bandwidth whatsoever for transmission between the relevant end-systems. Furthermore, it is not necessary for any special control activity to be made by user A in order for additional bandwidth to be allocated. A level of additional bandwidth will be assigned to user A when required.

It is possible for a single dynamic bandwidth controller (DBC) to be shared by several end-systems or signal sources. It is possible for a single dynamic bandwidth controller (DBC) to be shared by several end-systems or signal sources. For example, referring to FIG. 3, a DBC 20-3 is shown connected to a broadband ATM switch 12-3 forming part of the network 10, the traffic of three sources 14C being handled using an output buffer 28. The number of sources which can be handled by the DBC 20-3 is determined by the link rate L (i.e. there must be not so many sources that it is always the link rate L which is the limiting factor determining the available rate.) The aggregate cell rate of the ABR traffic from the sources 14C must not exceed L. This implies that if the traffic from each source is bursty, there may be times when the output buffer 28 is congested. This can be avoided by supplementing the cell rate (CR) feedback to the end-systems 14C with generic flow control (GFC) signals which operate to stop all transmissions from each source immediately.

Figure 3:
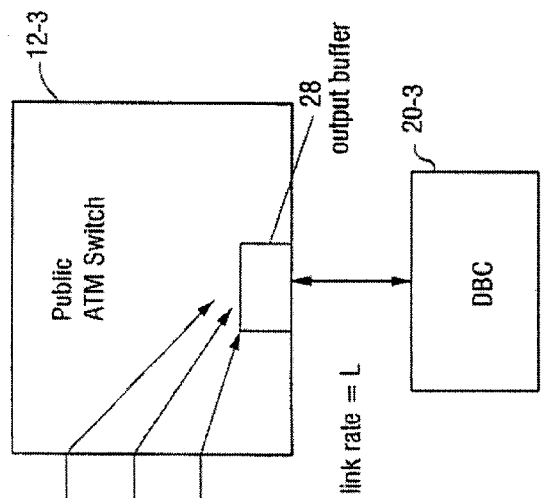
FIG. 3 is a diagram of part of a broadband switching system showing how a single bandwidth controller can be shared by several end-stations.

Whenever the dynamic bandwidth controller (DBC) is incorporated in the arrangements of FIG. 1, 2, or 3, its main functions are as follows.

Firstly, it provides buffering of incoming data cells, the degree of buffering at any given time being determined according to the transmission containing the cells, the transmission being identified by the VPI and VCI information referred to above. The DBC further controls or "shapes" the traffic fed to the network 10 so as to be equal to the current CR applicable to that particular transmission, the CR depending on the allocated bandwidth.

The allocated bandwidth, and hence the CR, for any given transmission is determined by the CAC 18 (see FIG. 1) on the basis of determining the route to be followed by the transmission and assigning a fair share of the available capacity on the route based upon the known number of active transmissions.

When a transmission begins it is detected in the DBC, which immediately transmits a low default CR corresponding to the pre-registered permanently allocated minimum bandwidth, to the relevant end-system 14 (see FIG. 1). Before this, the end-system will have received an CR corresponding to the pre-registered maximum bandwidth so that when it is not transmitting, it appears that the maximum bandwidth is available. The reduction to the low default CR ensures that a newly active transmitting source does not cause overload in the system 10 before the CAC 18 has been able to allocate bandwidth and derive an CR for that transmission. Such overload would typically cause cell loss for that transmission. The traffic associated with that transmission leaving the DBC 20 is shaped to correspond to the default CR. This is part of a second main function of the DBC, i.e. to send a feedback signal to the end-system for the purpose of controlling its transmitted cell rate. Indeed, each time the CAC 18 derives a new CR for a transmission, a CR advice signal is fed back to the end-system.

The pre-transmission buffering of the DBC is used to allow a cooperating end-system sufficient time to adjust its output to the latest CR feedback advice. This implies that there is sufficient buffering in the DBC to allow excess cells to enter for a period at least equal to the round trip delay between the DBC and the end-system. If cells continue to arrive from the end-system 14 at a rate greater than the advised feedback CR (for instance, because the CR was lost en route, or because of a faulty end-system) the excess cells will be dropped in the DBC by overflow of the buffer.

However, as will be described below it is sometimes desirable to deliberately cause the advised feedback CR to be greater than the CR to which the cells leaving the DBC 20 are shaped, in order to determine whether a particular end-system is making full use of its bandwidth allocation.

In the preferred DBC, it is also possible to include fault tolerance by making use of a buffer threshold. When the stored cells relating to a given transmission reach the threshold, retransmission of the CR advice feedback to the end-system is triggered. This feature is useful also as a mechanism for policing end-systems to prevent inefficient use of bandwidth, whether due to a faulty terminal or due to deliberate non-compliance with contracted transmission rules. In this way, interference with the quality of service provided for other, compliant end-systems is prevented. In effect, the DBC defines the ABR traffic contract with the network 10.

The modules of the DBC 20 will now be described in more detail with reference to FIG. 4.

Figure 4:
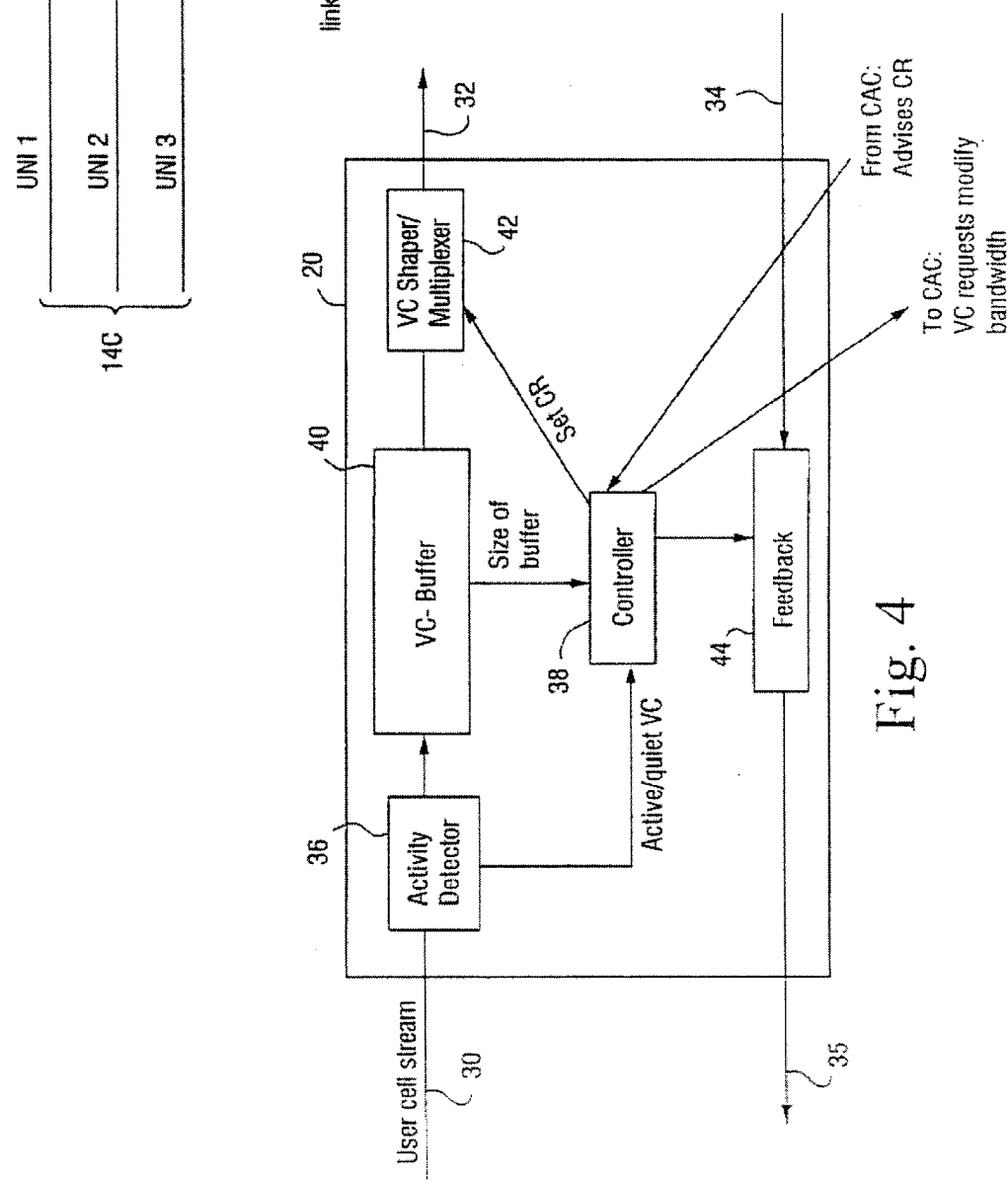
FIG. 4 is a block diagram of a bandwidth controller for use in the systems of FIGS. 1 and 2.
Figure 5D:
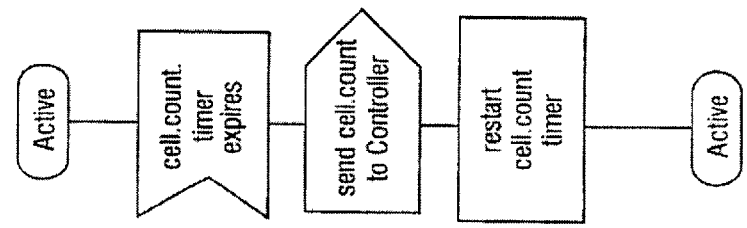
FIG. 5 is a specification description language diagram (SDL) for the activity detector module shown in FIG. 4.
Figure 5C:
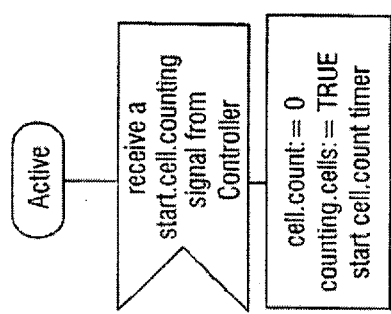
Figure 5B:
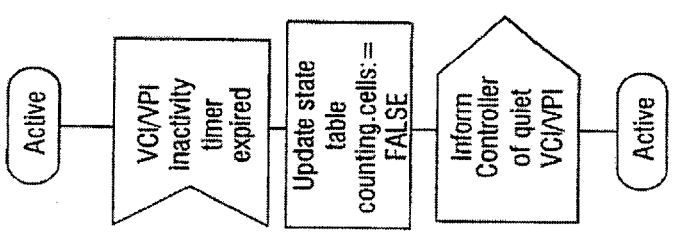
Figure 5A:
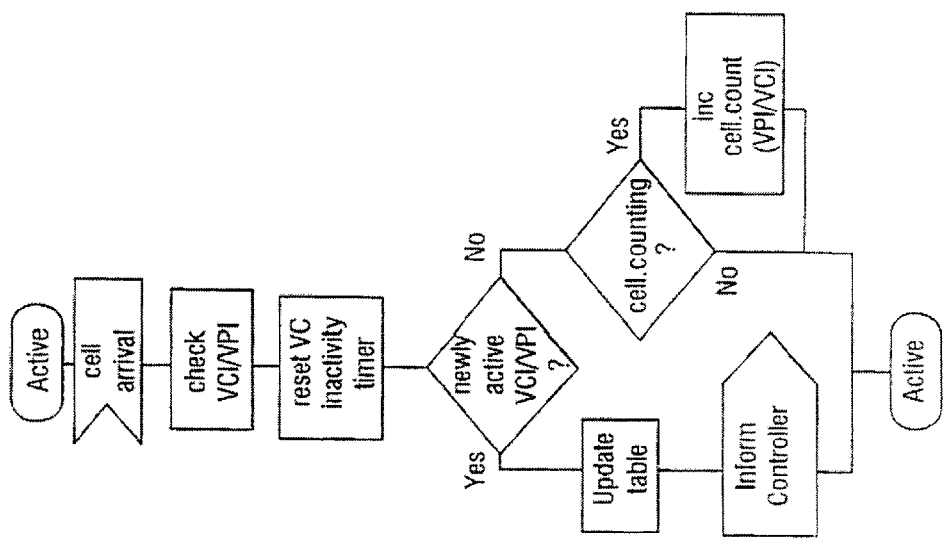

The DBC 20 is shown in FIG. 4 is a discrete unit having an input port 30 for receiving asynchronously transmitted data cells, an output for feeding data cells onto a switch 12 or 16 (see FIGS. 1 and 2) forming part of the switching network 10. The unit also has another input 34 for receiving messages back from the switch 12 or 16 and a feedback output 35 for transmitting feedback messages to the end-system 14 (shown in FIG. 1). Although the DBC 20 is shown as a discrete unit, it will be appreciated that FIG. 4 can be regarded as a functional diagram representing a subset system of a larger data processing unit, much of which may be embodied as software functions.

Incoming cells on input 30 arrive as a user cell stream which is fed firstly to an activity detector 36. The purpose of the activity detector is to provide state information to a controller module 38 about each received transmission, each transmission being identified by its VPI and VCI contained in the cell headers. A transmission is labelled active by the activity detector 36 if it was previously quiet and a cell having the appropriate VPI and VCI values is observed to be transmitted from an end-system to input 30. Synchronisation of the activity detector 36 with the start of a cell header may be carried out using an error check field contained in the cell header. The error check field, as its name suggests, provides a degree of redundancy, by which error checking may be performed on the header information. Thus, the principal reason for providing the header error check field is to ensure that the header information is correct, thereby ensuring that cells are not transmitted to erroneous addresses.

A transmission is considered to be in an inactive state if it was previously active and no cell having the appropriate VPI and VCI has been detected for a period of time t.

Activity detector 36 maintains a timer and state table for each VPI/VCI value pair. Preferably, t is set to be several seconds so that active-inactive-active transitions relating to any given VPI/VCI value pair which are of the order of several milliseconds remain undetected so that the transmission is indicated as remaining in the active state under these conditions. This has the effect of reducing the frequency of messages sent by the DBC 20 to the CAC 18 at some expense to lowering utilisation of the network.

Another function of the activity detector 36 is that of counting the cells for transmission (i.e. for transmission on a particular VP) during an interval between a "get cell count" and a "stop cell count" request from the controller 38. This information can be used, for example, for charging purposes and also by the controller 38 for assessing the actual cell rate of received transmissions.

Pseudocode for the activity detector is listed below and the corresponding SDL appears in FIG. 5.

```
BEGIN {cell arrival}
    cell arrival from end-system
    read VC
    reset VC inactivity timer
    IF VC is newly active THEN
        update state table
        advise CONTROLLER of newly active VC
    ELSE IF counting.cells(VPI/VCI) THEN
        increment cell.count(VPI/VCI)
    ELSE
        do nothing
END
BEGIN {VC timer expires}
    VC inactivity timer expires indicating quiet VC
    update state table
    advise CONTROLLER of quiet VC
    counting.cells := FALSE
END
BEGIN {receive a start.cell.count signal}
    receive a start.cell.count(VPI/VCI) signal from CONTROLLER
    cell.count(VPI/VCI) := 0
    counting.cells := TRUE
END
BEGIN {cell.count timer expires}
    cell.count timer expires
    send cell.count(VPI/VCI) to CONTROLLER
    restart cell.count timer
END
```

It will be seen that, as far as the incoming user cell stream is concerned, the activity detector 36 reads the VPI/VCI values in each cell header of the arriving cell stream, and this information is used to update the state table which it maintains for each VPI/VCI value pair. As far as communication with the controller 38 is concerned, the detector 36 informs the controller of a change of state of any VPI/VCI value pair. The controller can inform the activity detector of the timer value t to be used. Preferably, the same value of t is used for all VPI/VCI value pairs. Cell count information may be obtained from the activity detector 36 by the controller 38, through a "start.cell.count" message. When the activity detector receives this message, it initialises a timer, and counts each cell arrival. At the expiry of each cycle t, the activity detector sends the cell count to the controller.

The cells of the user cell stream arriving on input 30 are transmitted without delay to a buffer module 40 where they are stored in first-in, first-out (FIFO) buffer queues, each queue comprising cells having a given VPI/VCI value pair. The detector 36 is non-specific to cell type. Thus, the arrival of any data cells will be detected and can potentially affect the activity state associated with a VPI/VCI value pair, independently of the existence or absence of control or management cells. Buffered cells are fed from the buffer 40 to a shaper multiplexer module 42 prior to being fed to an ATM switch via output 32. Operation of the buffer and shaper/multiplexer modules 40, 42 will be described in more detail below. For the time being, it is sufficient simply to say that the buffer module is capable of signalling to the controller 38 when any buffer queue has reached a predetermined buffer fill threshold. The shaper multiplexer module 42 is responsible for removing cells from the buffer module 40 and transmitting them onwards towards their destination. It includes a multiplexer function and the shaper stores a CR value for each VPI/VCI value pair so that the cell stream fed from the output is shaped to ensure that the capacity of the respective path through the network for each transmission, as determined by the allocated bandwidth, is not exceeded. The controller 38 also controls a feedback module 44 for receiving feedback messages from the network on input 34 and from the controller 38 itself, for onward transmission to the end-system 14 via output 35. The functions of the buffer, shaper/multiplexer, and feedback modules 40, 42 and 44 will be described in more detail below. The controller 38 will be considered first.

The purpose of the controller 38 is to signal to the CAC 18 that an ABR type transmission identified by any given VPI/VCI value pair should have bandwidth in the network allocated or re-negotiated.

In this embodiment of the invention, a bandwidth re-negotiation signal is transmitted by the controller to the CAC 18 such that when the activity detector 36 indicates that a transmission having a particular VPI/VCI value pair is quiet, the bandwidth parameter for that transmission should be set to the predetermined minimum bandwidth value. For a newly active transmission, the bandwidth must be re-negotiated with the CAC, and is interpreted by the CAC 18 (FIG. 1) as a request for as much bandwidth as is available (within the constraint of the predetermined maximum bandwidth), in which case the CAC releases bandwidth to the transmission according to its own control parameters.

The controller 38 signals re-negotiation whenever the activity detector 36 indicates a state change for the transmission in question. This marks the start of an estimating period. At this point, the end-system still expects to be able to transmit at a CR corresponding to the maximum bandwidth whilst the CAC 18 still only maintains the permanent minimum allocation (to which the cells output from the DBC 20 are shaped). At the end of the estimating period (when the estimate timer expires), the controller 38 requests a buffer cell count from the buffer module 40. If the buffer cell count at the end of the estimating period is greater than zero (i.e. the end-system is sending at a rate greater than the minimum), the feedback module 44 is commanded to issue the minimum CR to the end-system via the output 35. If the buffer cell count is zero (i.e. the end-system is sending at a rate less than or equal to the minimum), then the end-system 14 requires no more bandwidth than the minimum bandwidth (since if it did, the buffer would have begun to fill up during the estimating period). The controller 38 advises CAC 18 of the amount of bandwidth required to service the connection, and starts a monitor timer which marks the start of monitoring the activity of the end-system. The monitor timer is set to time out at frequent intervals during the lifetime of the connection; this enables re-assessment of the use that the end-system is making of its CR allocation. It is possible for an end-system to increase, decrease or retain its current CR throughout the duration of the connection. The CAC 18 periodically offers the controller more bandwidth as it becomes available. When a new CR is received from the CAC 18, the feedback module is signalled to send this new CR to the end-system and the value is stored as updated CR. The monitoring loop described below is used to determine whether the end-system can make use of the offered bandwidth.

At each time-out of the monitor timer, the controller 38 requests a new buffer cell count from the buffer module 40 and compares this with the excess cell count stored during the last monitoring period.

If the current buffer count is less than the excess cell count, it can be assumed that during the monitoring period the user cell rate was less than the rate at which cells are shaped for output and the end-system is not making full use of its allocated bandwidth. The excess bandwidth can, therefore, be deallocated by setting the CR to become equal to the monitored user rate, and advising CAC 18 of the new CR, and by signalling to the shaper module 42 the new CR and by commanding the feedback module 40 to issue the new CR to the end-system. The monitor timer is then restarted.

If the current buffer cell count is greater than the excess cell count i.e. the user cell rate is greater than the shaper rate, the end-system is making use of the additional bandwidth provided by the new CR value (i.e. the end-system has increased its sending rate because the updated CR from the CAC has allowed it to). It will be noted from the above that the CAC 18 has already allocated additional bandwidth which has not been used by the DBC 20 since the shaper module 42 has not yet been advised of the latest CR provided by the CAC 18. Thus in this case, the stored CR is increased by setting it to become equal to the undated CR and this CR is sent to the shaper module 42. The current buffer cell count is stored as a new excess cell count. The monitor time is then restarted.

The third possibility is that the current cell count is equal to the excess cell count. This indicates that despite being offered increased bandwidth via the new CR value advice signal, the end-system has not changed its transmission rate. In this case, the controller 38 signals to the CAC 18 the actual rate of the end-system so that the CAC knows how much bandwidth is used and is then able to de-allocate any unused bandwidth. The shaper module and end-system are not signalled. Thus the shaper module 42 has a CR value corresponding to that known by the CAC 18 and the end-system has a CR value equal to the CR that was originally allocated by the CAC 18. The controller 38 then restarts the monitor timer.

When the activity detector 36 indicates that the transmission in question has ceased, the controller issues a quiet signal to the CAC 18 which causes it to allocate only the predetermined minimum bandwidth. The feedback module 40 is caused to issue a CR value equivalent to the maximum bandwidth and the shaper module is signalled with a CR equivalent to the minimum bandwidth. To the end-system it appears that it has access to the maximum bandwidth when it is not transmitting.

Regular monitoring of the buffer cell count largely avoids the possibility of cells being lost through buffer overflow.

Thus the controller 38 has three states; quiet, estimating, and monitoring.

An alternative strategy for preventing bandwidth being allocated when not required is as follows. The controller 38 sends a start cell count request to the activity detector 36, which in turn starts a monitor timer which may have a time-out period of t. At the end of this period the activity detector 36 sends the cell count to the controller 38. This information is processed to estimate the system capacity equivalent to the actual sending rate of the user. If this capacity is substantially less than the currently allocated capacity, it may imply that the user is attempting to keep a large capacity simply by sending a relatively slow trickle of cells to input 30 to keep the activity detector status for the relevant transmission in the active state. Clearly this situation results in inefficient use of the network, and the following steps are performed by the controller 38 when there is a substantial mismatch in the capacity assigned and currently used. Firstly, the shaper 42 is immediately re-set to drop to the actual CR for the relevant VPI/VCI value pair. Next, the feedback module 44 is commanded to issue the actual CR to the user via output 35. Finally, the controller 38 sends a bandwidth re-negotiation signal to the CAC, the signal including a bandwidth value which is set equal to the current equivalent capacity being used by the user. This signal is then interpreted by the CAC as an option to free capacity for other customers. As an alternative, the mismatch may be dealt with by assigning to the shaper and the feedback modules 42, 44 a default CR rather than the actual CR.

As mentioned above, the controller 38 is also arranged to receive a signal from the buffer module 40 when the buffer fill for a given VPI/VCI value pair has reached a given threshold. This signal causes the controller 38 to command the feedback module 44 to issue a so-called resource management (RM) cell, which will be described in more detail hereinafter. The controller 38 may also receive a DBC identity value for each new transmission (identified by a new VPI/VCI value pair) which is established, this DBC identity value being received from the CAC. Alternatively, the DBC may use a default identity if none is supplied.

Pseudocode for the controller appears below:—

```
BEGIN {Receive a VPI/VCI active signal}
    receive a VPI/VCI active signal from ACTIVITY DETECTOR
    start estimate timer
END {Receive a VPI/VCI active signal}
BEGIN {Estimate timer expires}
    estimate timer expires
    excess.cells:=buffer.count(VPI/VCI)
IF excess.cells> 0 THEN
        send minimum CR to feedback module
    ELSE
        do nothing
    request required amount of bandwidth from CAC
    start monitor_timer
END {Estimate timer expires}
BEGIN {monitor VPI/VCI rate}
    receive a new CR from CAC
    send new CR to feedback
    updated CR:=new CR
END {monitor VPI/VCI rate}
BEGIN {monitor timer expires}
    monitor timer expires
    IF user CR < shaper THEN      {vp not using full allocation}
        CR := user CR
        send CR to CAC, Shaper and feedback
    ELSE
    IF user CR > shaper CR THEN      {vp has increased rate}
        CR := updated CR
        send CR to Shaper
        excess.cells:=buffer.count(VPI/VCI)
    ELSE                                        {vp has stayed the same}
        CR := user CR
        send CR to CAC
        updated CR := CR
    END IF
    restart monitor timer
END {monitor timer expires}
BEGIN {Receive quiet VP from ACTIVITY DETECTOR}
    receive a quiet VPI/VCI signal from ACTIVITY DETECTOR
    send quiet VPI/VCI signal to CAC
    send maximum CR to feedback
    send minimum CR to shaper
END {Receive quiet VP from ACTIVITY DETECTOR}
```

```
BEGIN {Receive a VPI/VCI buffer threshold signal}
    receive a VPI/VCI buffer-threshold signal from VPI/VCI-buffer
    advise FEEDBACK to retransmit CR to end-system
END {Receive a VPI/VCI buffer threshold signal}
```

SDLs for the controller are shown in FIGS. 6-1 and 6-2.

The controller 38 may be arranged to write a DBC, VPI/VCI identity value pair into the feedback module 44. It is also arranged to instruct the feedback module 44 to issue a resource management command for a specific VPI/VCI value pair. This instruction may also contain an appropriate CR pair T, τ, (T is an average cell inter-arrival time and τ is a burst tolerance). It should be noted that only one change in the values specified in an RM cell is sent for each new VPI/VCI value pair whenever the CAC updates the CR value (one or more repeat RM cells may be sent if the first one has apparently not been received). Typically, this may be once every 30 seconds or more in a public network, and depends upon the sensitivity setting of the activity detector in the DBC 20. It follows that the required feedback control bandwidth can be relatively small.

As will be seen from the pseudocode, the controller 38 receives signals from the buffer module 40 whenever a buffer fill threshold is reached by cells having a specific VPI/VCI value pair.

The interface with the activity detector 36 has already been described.

The purpose of the feedback module 44 will now be described briefly.

As mentioned above, the feedback module 44 transmits current CR values (as signalled by the controller 38) to the end-system via output 35. The CR is transmitted using a resource management cell as shown in FIG. 7. Optionally, one field of this cell is the DBC identity value which is used to enable an end-system 14 (see FIG. 1) to distinguish between CR advices from different DBCs (e.g. DBCs 20-1 and 20-2 as shown in FIG. 2) in the end-system to end-system path. This DBC identity field is indicated as field 50 in FIG. 7. The CR is placed in field 52. This RM cell, like other cells, has a five octet header which contains a PT field 54 indicating that the cell is a resource management (RM) cell.

It is proposed that, if used, DBC identity values are not fixed but are chosen at the time of setting up the transmission path through the network for a given a VPI/VCI value pair. This implies that the CAC 18 assigns a value for the DBC identity for each VPI/VCI value pair, and the feedback module 44 maintains a table of (DBC, VPI/VCI) identity pairs. For example, in FIG. 2, public network 10-1 is arranged to choose a DBC identity for a given VPI/VCI pair and signals this information forwards so that public network 10-2 does not chose the same value (e.g. public network 10-1 assigns identity 1, public network 10-2 assigns identity 2, etc). The DBC identity value is stored in a table maintained by the feedback module 44.

The CR field 52 in the RM cell (see FIG. 7) contains the CR advice from the CAC which is provided as the average cell inter-arrival time T, plus a burst tolerance τ.

Operation of the feedback module 44 is triggered by the controller 38 (a) when a new CR is advised by the CAC 18, and (b) when the buffer fill level in buffer module 40 corresponding to any VPI/VCI value pair rises above the buffer fill threshold. A RM cell is then sent to the end-system.

Figure 8A:
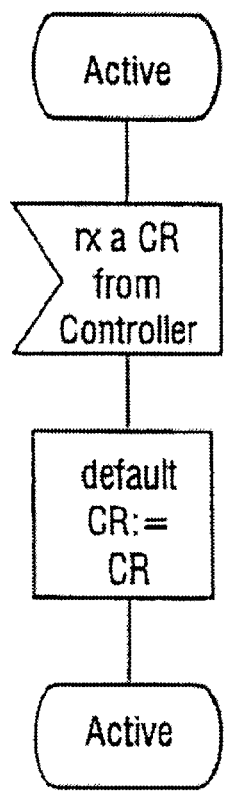
FIG. 8 is an SDL for the feedback module of FIG. 4.
Figure 8B:
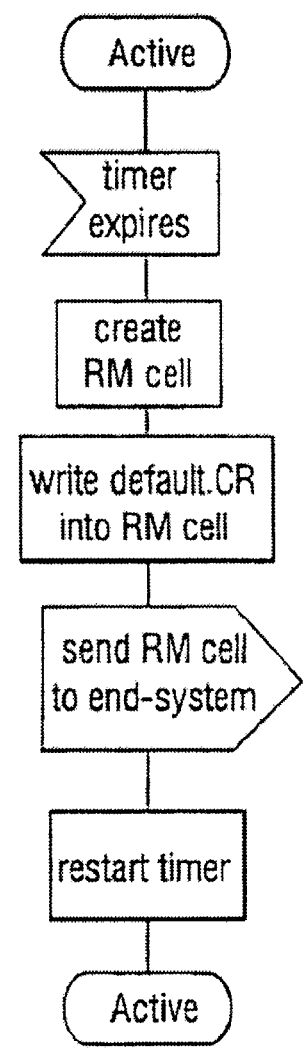

The pseudocode for the feedback module 44 is as follows and the corresponding SDL is shown in FIG. 8.

```
BEGIN {Receive a CR}
    receive a CR for a VPI/VCI from Controller
    default_CR:=CR
END {Receive an CR}
BEGIN {RM.cell timer expires}
    RM.cell timer expires
    Create RM.cell
    write default.CR into RM.cell
    send RM.cell to end-system
    restart RM.cell timer
END {cell arrival from network}
```

Next the buffer module 40 will be considered.

The buffer module is shown in more detail in FIG. 9. Its purpose is to store incoming data cells on the basis of the VPI/VCI value pairs contained in the cells. Buffering the cells allows an end-system 14 (FIG. 1) time to respond to a feedback signal from module 44. Another function of the buffer module 40 is to send a signal to the controller 38 when the buffer fill threshold is reached, indicating that an end-system is not responding to a feedback signal (this in turn causes the controller 38 to re-send a CR to the end-system, as mentioned above). The buffer module 40 also drops received cells when the maximum buffer allocation for a given VPI/VCI value pair is exceeded. This is done by buffer overflow.

For example, if the DBC 20 has a combined input rate from all sources of 150 Mbit/s, then, if the round trip delay to the end-system is 100 μs, there will be less than 35 cells in flight whenever the CR values are changed.

The size of the shared memory area 56 is mainly to cater for changes in the burst tolerance, because a change in this rate leads to only a small number of excess cell arrivals (e.g. around 35 cells). The fixed cell positions assigned to respective VPI/VCI value pairs are designated by the reference numeral 58 in FIG. 9. The cells in these positions represent the front cells of a plurality of queues, each queue having its own VPI/VCI value pair. In other words, the queues can be visualised as running horizontally in FIG. 9 with the front cells at the right hand side. Cells arriving in the buffer module 40 are placed in the queues in a first-in, first-out (FIFO) order.

Cells are removed from the buffer module 40 when an appropriate signal is received from the shaper section of the shaper/multiplexer module 42, as defined by the buffer module pseudocode which follows:—

```
BEGIN {Receive a cell}
    receive a cell
    IF there is room in the buffer THEN
        put cell in buffer
        increment buffer-fill level
    IF buffer-fill level = Threshold THEN
            transmit buffer-full signal to CONTROLLER
    ELSE
            do nothing
END {Receive a cell}
BEGIN {Receive a fetch}
    receive a VPI/VCI fetch signal from the SHAPER/MUX
    pass cell from buffer to the SHAPER/MUX
    decrement buffer-fill level
END {Receive a fetch}
```

Figure 10A:
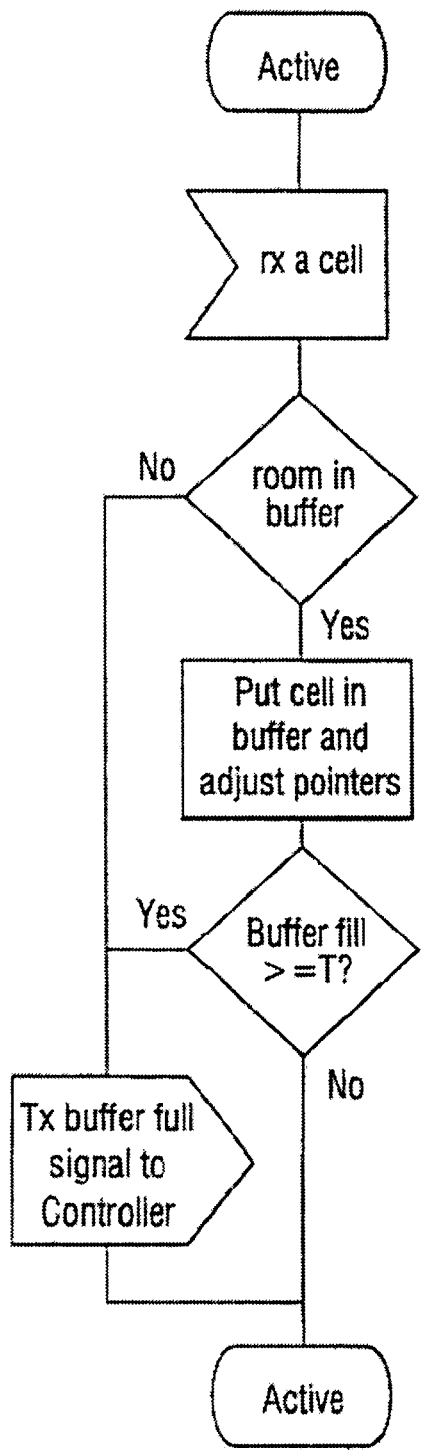
FIG. 10 is an SDL for the buffer.
Figure 10B:
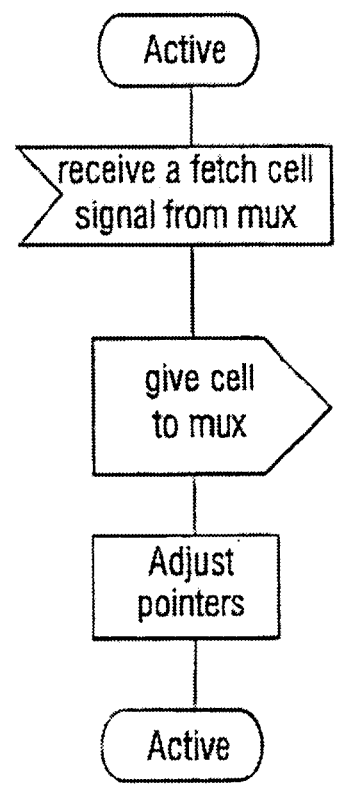
Figures 1C, 12:
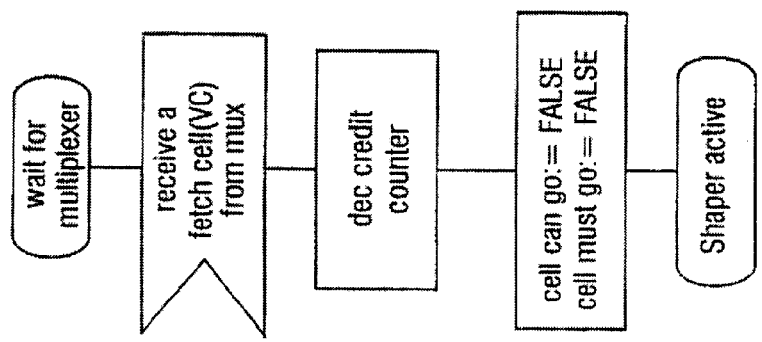
FIG. 1 is a diagram of a broadband switching system in accordance with the invention.
Figures 1B, 12:
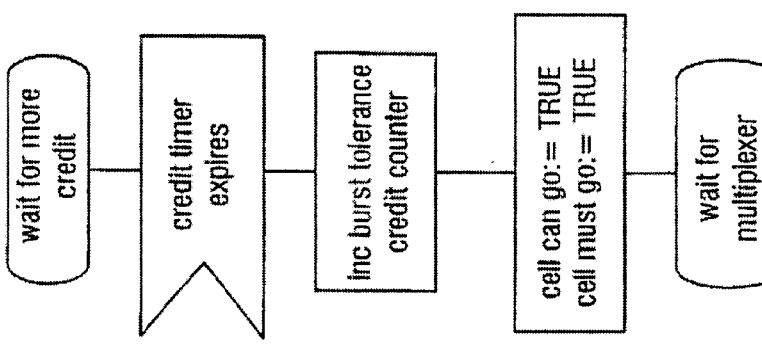
Figures 1A, 12:
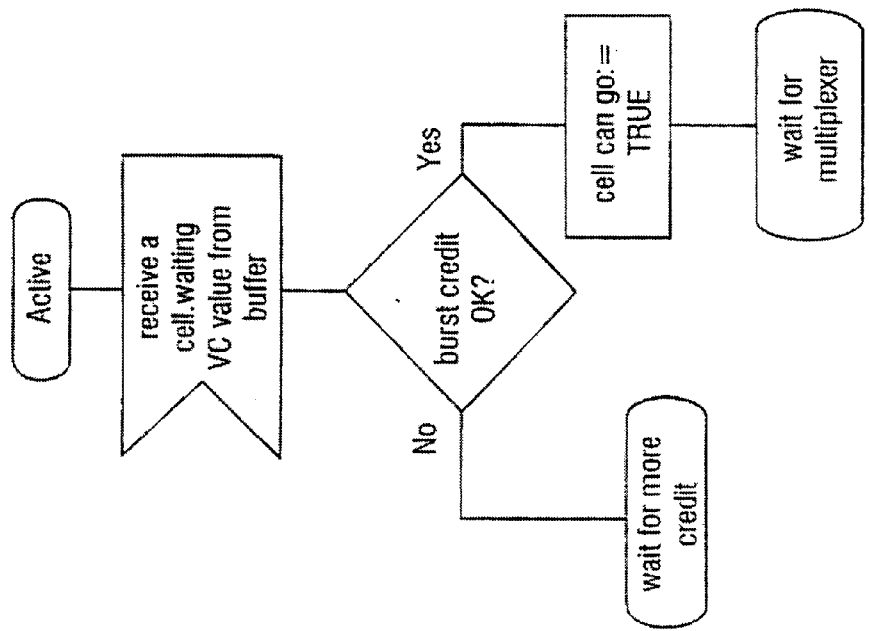
Figures 2F, 12:
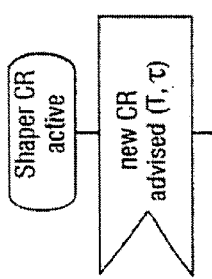
FIG. 2 is a diagram of another broadband switching system in accordance with the invention.
Figures 2G, 12:
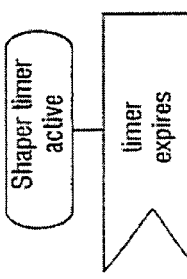
Figures 2E, 12:
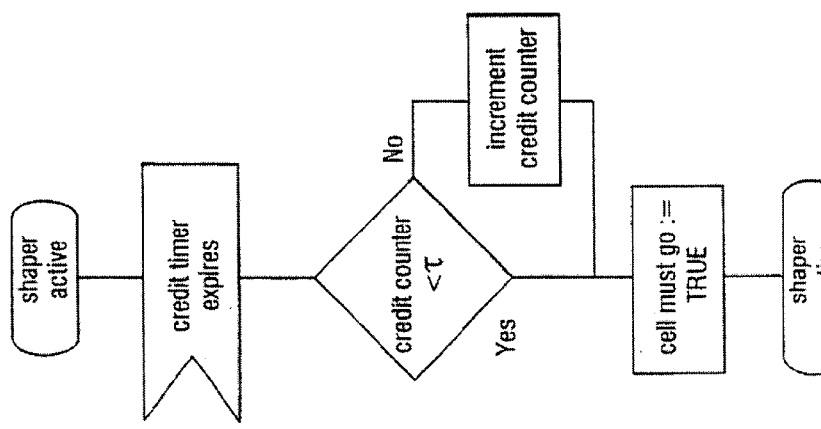
Figures 2D, 12:
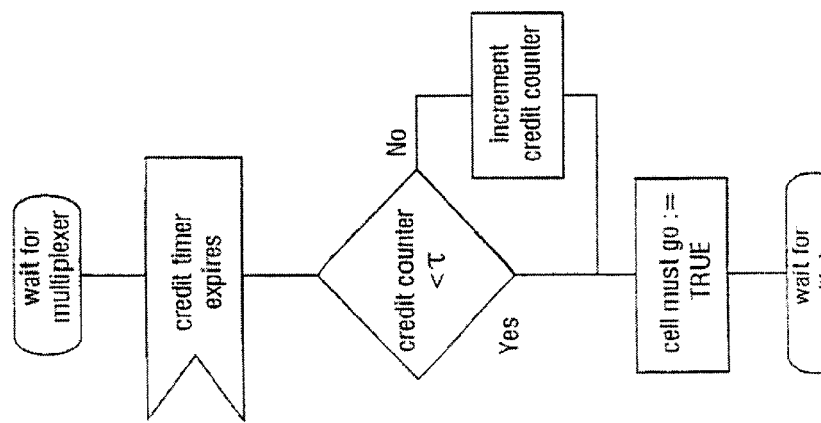
Figures 3H, 12:
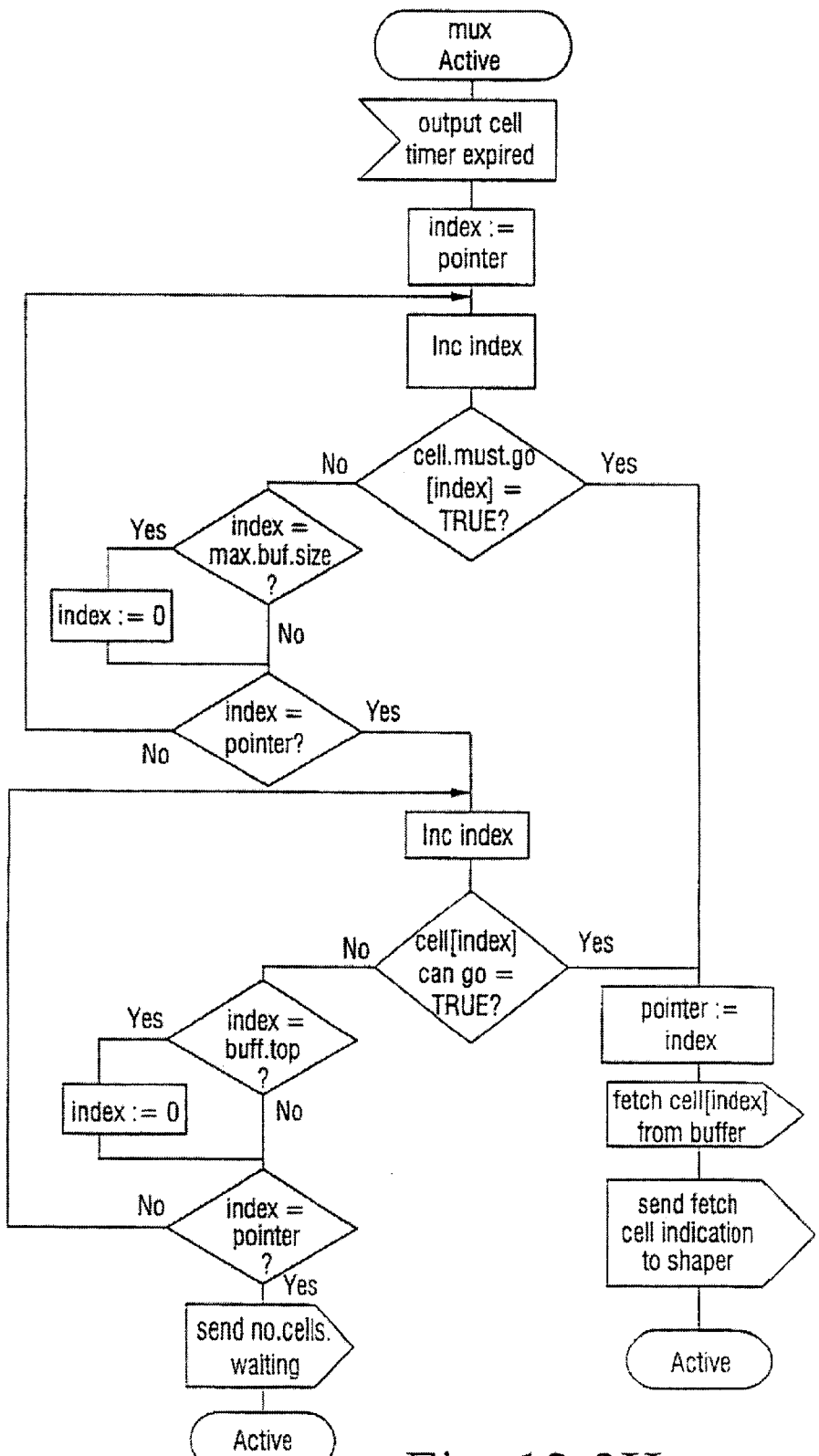

The corresponding SDL appears in FIG. 10.

Referring now to FIG. 4 in combination with FIG. 11, the shaper/multiplexer module 42 operates to remove cells from the buffer module 40 and to transmit them onwards towards their destination via the network switches. Module 42 has two parts which are a multiplexer 60 and a shaper 62. For each VPI/VCI value pair, the shaper 62 maintains a sustained cell rate (CR) value and a timer.

The cell stream fed to output 32 is shaped by the shaper so that bursts which are not greater than the burst tolerance pass without being delayed by the shaper 62. However, the multiplex function may delay a cell if several transmissions represented by different VPI/VCI value pairs are bursting simultaneously. In this case, the multiplexer 60 assigns each active VPI/VCI value pair a fair share of the DBC output bandwidth. It does this by polling active VPI/VCI value pairs in a round-robin fashion. Cells which are waiting for a period equal to or greater than the rate interval T are flagged with a higher priority "cell must go" value. The multiplexer picks up these cells first (see FIG. 11). Cells will be forced to wait by the shaper function if bursts arrive which are longer than the burst tolerance credit value. The detailed operation of the shaper/multiplexer module 42 will become apparent from the following pseudocode:—

```
1.  BEGIN {STATE = ACTIVE}
        receive a cell.waiting[VPI/VCI] signal from buffer
        IF burst credit ok THEN
            cell.can.go:= TRUE
            STATE:= WAIT for multiplexer
        ELSE {burst credit not ok}
            STATE := WAIT for credit timer to expire
    END
2.  BEGIN {STATE = WAIT for credit timer to expire}
        credit timer expires
        increment burst tolerance credit counter
        cell.can.go := TRUE
        cell.must.go := TRUE
        STATE := WAIT for multiplexer
    END
3.  BEGIN {STATE = WAIT for multiplexer}
        receive a fetch.cell[VPI/VCI] from multiplexer
        decrement credit counter
        cell.can.go := FALSE
        cell.must.go := FALSE
        STATE:= ACTIVE
    END
4.  BEGIN {STATE = WAIT for multiplexer}
        credit timer expires
        IF credit counter < τ THEN
            increment credit counter
        ELSE
            do nothing
        cell.must.go := TRUE
    END
5.  BEGIN {STATE = SHAPER ACTIVE}
        credit timer expires
        IF credit counter < τ THEN
            increment credit counter
        ELSE
            do nothing
        cell.must.go := TRUE
    END
6.  BEGIN {STATE = SHAPER.CR ACTIVE}
        new CR advised (T,τ)
        nextT:= T
        nextcredit: = τ
    END
7.  BEGIN {STATE = SHAPER TIMER ACTIVE}
        timer expires
        reset timer (nexT)
    END
8.  BEGIN {STATE = MULTIPLEXER ACTIVE}
        output cell timer expires
        index := pointer
        REPEAT    {1st loop of searching for cell.must.go}
            increment index
            IF cell.must.go[index] THEN
                pointer:= index
                fetch cell[index] from buffer
                send fetch cell signal to SHAPER
                STATE := MUX.ACTIVE
            ELSE
                IF index = max.buffer.size THEN
                    index := 0
        UNTIL index = pointer
        REPEAT    {2nd loop of searching for cell.can.go}
            increment index
            IF cell.can.go[index] THEN
                pointer:= index
                fetch cell[index] from buffer
                send fetch cell signal to SHAPER
                STATE := MUX.ACTIVE
            ELSE
                IF index = max.buffer.size THEN
                    index := 0
        UNTIL index = pointer
        send no.cell.waiting.signal
    END
```

It will be understood that when the DBC 20 requests a change in the bandwidth allocated to a particular transmission, the CAC must control other traffic in the network so that the network capacity is used most effectively. The description which follows deals with connection admission control methods for overcoming the problem of traffic rebalancing.

Two connection admission control strategies will now be described. Both tackle the problem of rebalancing traffic. In other words, when a transmission becomes quiet or newly active, it is necessary to determine how many other control messages need to be generated for other transmissions. The object is to make this number of control messages as small as possible.

The first strategy involves a relatively simple connection admission control method which involves no actual rebalancing. In this method, a newly active transmission (VPI/VCI value pair) is given a single cell rate (CR) which is retained until the transmission goes quiet again. Only when it is subsequently reactivated will the transmission get a different CR. This means that a quiet signal relating to one VPI/VCI value pair will cause no control signals to be generated for other VPI/VCI value pairs which were sharing capacity with it.

This is combined with a filling method which involves (i) giving a first newly active connection an effective capacity which is half of the total available capacity; (ii) giving the next newly active connection an effective capacity which is half of the remaining capacity; (iii) giving the next newly active connection an effective capacity which is half of the still remaining capacity; and so on. This method is applied link-by-link over the entire route identified by the VPI/VCI value pair, and whichever yields the lowest effective capacity is the determinant of the CR fed back to the DBC 20.

It follows that a newly active signal having one VPI/VCI value pair generates no control signals for the other VPI/VCI value pairs which are sharing the capacity.

Since the DBC 20 is designed such that a user can only maintain a large effective capacity on the network so long as the VPI/VCI value pair remains in the active state in the activity detector 36 (FIG. 4), and the cell rate generated by the customer is close to the effective bandwidth value (refer to the cell-counting function of the activity detector described above), it follows that users can only hold onto large effective bandwidths for as long as they are prepared to be charged for the proportionally larger loads which they are submitting.

This method is fair to users in the sense that, over a sufficiently long period, no user is systematically given a poorer capacity.

However, it is desirable in some circumstances to increase the number of users who are able to secure relatively large bandwidth allocations and this can be catered for by a second, modified method as follows.

In this case the underlying principle is that, if an active signal causes control signals for other VPI/VCI value pairs, let the signal be limited to only one per link, namely the richest (largest capacity) VPI/VCI value pair. This can be described as a limited rebalancing method or a "take-only-from-the-richest" (Robin Hood) method.

This can best be illustrated with an example filling method:—
(i) the first newly active VPI/VCI value pair is assigned an effective capacity equal to half of the total available capacity;
(ii) the next newly active connection is assigned half of the remaining capacity plus a fifth of the effective capacity of the first VPI/VCI value pair (i.e. the current richest);
(iii) the next newly active connection is assigned half of the remaining capacity plus one fifth from the current richest; and so on.

To illustrate this process, it may be imagined that there is a single link with a capacity of 100 Mbit/s. The above steps then result in the following exemplary steps:—
(i) the first newly active VPI/VCI value pair gets 50 Mbit/s and there is 50 Mbit/s remaining;
(ii) the next VPI/VCI value pair gets half of the remainder (which yields 25 Mbit/s) plus a fifth from the first, which means that the first now has 40 Mbit/s, and the second has 35 Mbit/s;
(iii) the next VPI/VCI value pair gets half of the remainder, which yields 12.5 Mbit/s plus a fifth from the first, so that the first now has 32 Mbit/s, the second still has 35 Mbit/s, the third has 20.5 Mbit/s, and so on.

Note that more of the users are now getting large capacities, but there is only one extra control message to send on the link. There is thus a limited rebalancing or "Robin Hood" strategy.

To extend the method to a route with many links, the above process is repeated link-by-link. Whichever link yields the lowest effective capacity is the determinant of the CR value sent back to the dynamic bandwidth controller (DBC). Now, using this value of effective capacity, the CAC assigns it link-by-link by taking half of the remaining capacity on that link, and any extra which is needed is taken from the richest VPI/VCI value pair on that link. Consequently, this generates at most one additional CR control message per link for each VPI/VCI active signal sent to the network. A quiet signal still generates no additional control messages.

This strategy also makes it impossible for a user to hold onto a very large capacity when others become active. In addition, as many users as possible are given a reasonably large capacity while keeping the complexity of traffic rebalancing to a minimum.

In summary, in a broadband switching system for the switching of asynchronously transferred cells of data, a dynamic bandwidth controller (DBC) controls the application of data cells at an input port of the system, the data cells being supplied by a number of transmitting end-stations. The DBC detects incoming cells, identifies the source of the cells, provides buffering for the cells, and controls the output of the cells to the system switches according to a current cell rate (CR) assigned to the cells from the respective source. The system also includes a connection admission (CAC) module which determines bandwidth available in the system. The DBC and CAC operate together to maintain a permanent virtual path of a predetermined minimum bandwidth through the system and allocate additional bandwidth on demand up to a maximum. The additional bandwidth allocated to the path can be automatically removed or reduced if it is not used by the source. Feedback to the source can be provided to prevent cells being supplied at a rate which would result in significant cell loss due co the limitation of bandwidth available for the path in the system.

What is claimed is:

1. A broadband switching subnet comprising:
   at least one ingress selectively connectable to a link to a respective signal source and at least one egress selectively connectable to a link to a selected signal receiving system;
   at least one switch for transmitting information-carrying asynchronously transferred data cells from the ingress to the egress;
   a subnet control means for accepting and establishing a virtual connection at a predetermined base bandwidth between the ingress and the egress via said switch, and
   a bandwidth control means automatically detecting said data cells received at the ingress, automatically determining whether the currently allocated bandwidth is insufficient for the reception rate of said data cells, and, if the rate is insufficient, automatically initiating and causing the subnet control means selectively to allocate additional bandwidth as available in addition to the base bandwidth for the transmission of the cells to the egress and causing a feedback signal to be sent to the ingress to advise a signal source of a new permitted sending rate.

2. A subnet according to claim 1, wherein the system control means include a stored table for associating the predetermined bandwidth with a respective signal source.

3. A subnet according to claim 1, wherein the bandwidth control means is arranged to detect when a signal source is inactive and to automatically transmit a maximum cell rate value to said signal source which is inactive, which represents the maximum rate at which the signal source should send cells immediately after a period of inactivity.

4. A subnet according to claim 1, wherein the bandwidth control means is arranged periodically to automatically estimate the cell supply rate and, in response thereto, to automatically reallocation of the said additional bandwidth by the system control means and retransmission of a maximum cell rate value according to the estimated cell rate.

5. A subnet according to claim 4, wherein the reallocation comprises a reduction in the said additional bandwidth.

6. A dynamic bandwidth controller for a broadband switching subnet, which subnet comprises:
   an ingress connectable to a link to a signal source, an egress connectable to a link to a selected signal receiver, and
   at least one switch, said switching system being operable to transmit information carrying asynchronously transferred data cells from said ingress to said egress via said at least one switch, wherein the controller for the subnet further comprises:
means for causing the establishment of a virtual connection at a predetermined base bandwidth between said ingress and said egress, means for detecting the said cells received at the ingress,
means for automatically determining a bandwidth requirement of the detected cells using cell-rate estimation,
means for automatically issuing a bandwidth request signal automatically in response to such cell detection and a bandwidth determination to cause additional bandwidth in addition to the base bandwidth to be allocated in the system for the transmission of the cells to the egress, and
means for automatically causing a feedback signal to be sent to the ingress to advise a signal source of a new permitted sending rate.

7. A method of operating a broadband switching subnet having an ingress connectable to a link to a signal source, an egress connectable to a link to a selected signal receiver, and at least one switch, said switching subnet being operable to transmit information-carrying asynchronously transferred data cells from said ingress to said egress via said at least one switch, the method comprising:
   maintaining a virtual connection with a predetermined minimum bandwidth between the ingress and the egress,
   automatically determining whether the detected data cell supply rate exceeds the minimum bandwidth,
   automatically detecting a rate at which the data cells for the said connection are supplied to the ingress,
   in response to detection of the data cell supply rate in excess of that which can be accommodated by the minimum bandwidth, said subnet automatically initiating a request for and allocating additional bandwidth to the connection without requiring human intervention to allocate the additional bandwidth, and
   causing a feedback signal to be sent to the ingress to advise a signal source of a new permitted sending rate.

8. A method according to claim 7, wherein the additional bandwidth is limited to a maximum value, and in that the additional bandwidth is de-allocated in response to a detection of a supply cell rate which is less, by a predetermined amount, than that which can be accommodated by the sum of the minimum bandwidth and the allocated additional bandwidth.

9. A method of operating a broadband switching subnet having an ingress connectable to a link to a signal source, an egress connectable to a link to a selected signal receiver, and at least one switch, said method comprising:
   a. transmitting information-carrying asynchronously transferred data cells from said ingress to said egress through the at least one switch;
   b. maintaining a virtual connection with a predetermined minimum bandwidth between the ingress and the egress for the transmission of the data cells;
   c. detecting within the subnet a rate at which the data cells for the said connection are supplied to the ingress from the signal source;
   d. automatically determining whether the rate of data cells exceeds a predetermined threshold;
   e. if the rate of data cells exceeds the predetermined threshold, the subnet automatically allocating additional bandwidth to the virtual connection without requiring intervention of the signal source or signal receiver, and
   f. sending a feedback signal to the ingress providing notice of a new permitted signal sending rate.

10. A method of operating a broadband switching subnet as in claim 9 wherein step (c) is performed by a dynamic bandwidth controller (DBC) which buffers the data cells received from the signal source.

11. A method of operating a broadband switching subnet as in claim 10 wherein in step (c) the detection of the rate of data cells is performed by monitoring the data cells buffered in the DBC.

* * * * *